(12) United States Patent
Lei

(10) Patent No.: US 11,751,172 B2
(45) Date of Patent: *Sep. 5, 2023

(54) METHOD AND APPARATUS FOR SIDELINK RESOURCE CONTROL

(71) Applicant: Tencent Technology (Shenzhen) Company Limited, Guangdong (CN)

(72) Inventor: Yixue Lei, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,105

(22) Filed: Mar. 30, 2022

(65) Prior Publication Data

US 2022/0225294 A1    Jul. 14, 2022

Related U.S. Application Data

(63) Continuation of application No. 16/601,092, filed on Oct. 14, 2019, now Pat. No. 11,330,562.

(Continued)

(51) Int. Cl.
*H04W 72/02* (2009.01)
*H04W 72/0453* (2023.01)
(Continued)

(52) U.S. Cl.
CPC ............ *H04W 72/02* (2013.01); *H04W 4/40* (2018.02); *H04W 72/0453* (2013.01); *H04W 80/12* (2013.01); *H04W 92/18* (2013.01)

(58) Field of Classification Search
CPC ... H04W 72/02; H04W 4/40; H04W 72/0453; H04W 80/12; H04W 92/18; H04W 4/46;
(Continued)

(56) References Cited

U.S. PATENT DOCUMENTS 9,179,283 B2    11/2015  Zhu et al.
9,713,182 B2 *   7/2017  Baek ..................... H04W 76/14
(Continued)

FOREIGN PATENT DOCUMENTS

JP    2017225188 A    12/2017
JP    2018042281 A     3/2018
(Continued)

OTHER PUBLICATIONS

ZTE (Rapporteur): "Report of email discussion [103bis#40] [NR/V2X] RAT selection for SL", 3GPP Draft; R2-1816994 Report of [103BIS#40] [NR V2X]-RAT Selection for SL-VS, 3rd Generation Partnership Project (3GPP), Mobile Competence Centre ; 650, Route Des Lucioles ; F-06921 Sophia-Antipolis C vol. RAN WG2, no. Spokane, USA; Nov. 12, 2018-Nov. 16, 2018, Nov. 13, 2018.
(Continued)

*Primary Examiner* — Ayanah S George
(74) *Attorney, Agent, or Firm* — ARENTFOX SCHIFF LLP

(57) ABSTRACT

In a method of sidelink resource control, a first core network configured based on a first radio access technology receives a sidelink control request from a first user equipment that accesses the first core network using the first radio access technology, the sidelink control request requesting sidelink control information for a second radio access technology that is not supported by the first core network. The sidelink control information for the second radio access technology is obtained directly from a second core network outside the first core network, the second core network being configured based on the second radio access technology, and the sidelink control information for the second radio access technology being provisioned by the second core network. The obtained sidelink control information for the second radio access technology is provided, via the first radio access
(Continued)

technology and in response to the sidelink control request, to the first user equipment.

20 Claims, 9 Drawing Sheets

Related U.S. Application Data

(60) Provisional application No. 62/772,062, filed on Nov. 27, 2018.

(51) Int. Cl.
    *H04W 4/40* (2018.01)
    *H04W 80/12* (2009.01)
    *H04W 92/18* (2009.01)

(58) Field of Classification Search
    CPC .. H04W 76/14; H04W 72/1215; H04W 72/20
    See application file for complete search history.

(56) References Cited

U.S. PATENT DOCUMENTS

| | | | |
|---|---|---|---|
| 2014/0198719 A1 | 7/2014 | Vanderveen et al. | |
| 2019/0082501 A1* | 3/2019 | Vesely | H04W 92/20 |
| 2019/0274121 A1* | 9/2019 | Wu | H04W 48/10 |

FOREIGN PATENT DOCUMENTS

| | | |
|---|---|---|
| WO | 2018149265 A1 | 8/2018 |
| WO | 2018186552 A1 | 10/2018 |

OTHER PUBLICATIONS

Intel Corporation: "On RAT selection for NR V2X", 3GPP Draft; R2-1816702, 3rd Generation Partnership Project (3GPP), Mobile Competence Centre ; 650, Route Des Lucioles ; F-06921 Sophia-Antipolis Cedex ; France, vol. RAN WG2, no. Spokane, Washington, USA; Nov. 12, 2018-Nov. 16, 2018, Nov. 12, 2018.

CATT, Discussion on LTE Uu and NR Uu control NR sidelink in NR V2X[online], 3GPP TSG RAN WG1 #94b R1-1810544, Oct. 12, 2018.

NTT DOCOMO, Inc., LTE and NR sidelink coexistence[online], 3GPP TSG RAN WG1 #95 R1-1813323, Nov. 16, 2018.

Japanese Office Action dated Jun. 13, 2022 in Application No. 2021-520199 with Translation, 14 pages.

Supplementary European Search Report dated Jul. 21, 2022 in Application No. 19890186.0, 11 pages.

* cited by examiner

METHOD AND APPARATUS FOR SIDELINK RESOURCE CONTROL

INCORPORATION BY REFERENCE

This application is a continuation of application Ser. No. 16/601,092, filed Oct. 14, 2019, which claims the benefit of U.S. Provisional Application No. 62/772,062, "METHOD OF CROSS-RAT SIDELINK RESOURCE CONTROL BETWEEN EPS AND 5GS" filed on Nov. 27, 2018. The disclosures of the prior applications are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless communication systems can provide various telecommunication services such as telephony, video, data, messaging, and broadcasts. With continuous developments of wireless communication technologies, multiple radio access technologies that adopt different telecommunication standards may co-exist. For example, new radio (NR), which is also referred to as fifth generation (5G), is new radio access technology (RAT) beyond Long Term Evolution (LTE) which is also referred to as fourth generation (4G). NR may coexist with LTE during network deployments of the new generation.

SUMMARY

Aspects of the disclosure provide methods, apparatuses and systems for wireless communication. In some embodiments, a wireless communication system includes processing circuitry. The processing circuitry of the wireless communication system operates based on a first radio access technology. The processing circuitry receives a sidelink control request from a first user equipment that accesses the wireless communication system using the first radio access technology. The sidelink control request requests sidelink control information for a second radio access technology. The processing circuitry then obtains the sidelink control information for the second radio access technology, and provides, via the first radio access technology, the sidelink control information for the second radio access technology, to the first user equipment. The sidelink control information is used to configure a sidelink between the first user equipment and a second user equipment using the second radio access technology.

In some examples, the first radio access technology is evolved universal terrestrial radio access (E-UTRA) technology, and the second radio access technology is new radio (NR) technology. In some examples, the first radio access technology is new radio (NR) technology, and the second radio access technology is evolved universal terrestrial radio access (E-UTRA) technology.

In an embodiment, the processing circuitry communicates with another wireless communication system configured based on the second radio access technology to obtain the sidelink control information for the second radio access technology.

In another embodiment, the processing circuitry acquires, from a control function server in the wireless communication system, sidelink control information for the first radio access technology. The processing circuitry communicates with another wireless communication system to provide the sidelink control information for the first radio access technology to the other wireless communication system. The other wireless communication network provides, using the second radio access technology, the sidelink control information for the first radio access technology to the second user equipment to enable the second user equipment to configure the sidelink between the first user equipment and the second user equipment using the first radio access technology.

In some embodiments, the processing circuitry provides sidelink control information for the first radio access technology to an application function (AF) server system. The AF server system provides the sidelink control information for the first radio access technology to the first user equipment and the second user equipment via channels in an application layer. The sidelink control information for the first radio access technology is used to configure a sidelink between the first user equipment and the second user equipment using the first radio access technology.

Aspects of the disclosure provide methods for an application function server system to control sidelink resource. In some embodiments, an application function (AF) server system receives sidelink control information for a first radio access technology from a first network configured based on the first radio access technology. Then, the AF server system coordinates with a first user equipment that accesses the first network using the first radio access technology, and a second user equipment that accesses a second network using a second radio access technology, via channels in an application layer. The AF server system provides the sidelink control information for the first radio access technology to the first user equipment and the second user equipment using the channels in the application layer for configuring a sidelink between the first user equipment and the second user equipment.

In some examples, the first radio access technology and the second radio access technology are evolved universal terrestrial radio access (E-UTRA) technology and new radio (NR) technology respectively.

In an embodiment, the AF server system receives sidelink control information for the radio access technology from the second network configured based on the first radio access technology. The AF server system can provide the sidelink control information for the second radio access technology to the first user equipment and the second user equipment using the channels in the application layer for configuring the sidelink between the first user equipment and the second user equipment.

In an example, the AF server system encrypts the sidelink control information for the first radio access technology in a message to be transmitted via the channels in the application layer.

Aspects of the disclosure also provide methods for sidelink resource control in user equipment. In some examples, a first user equipment establishes a radio connection with a first network using a first radio access technology. The first user equipment discovers a second user equipment that accesses a second network using a second radio access technology. The first user equipment sends a request to the first network that requests sidelink control information for the second radio access technology. Then, the first user equipment receives wireless signals in the first radio access technology that carries the sidelink control information for the second radio access technology. The sidelink control information for the second radio access technology is sourced from the second network in an example.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide techniques of radio resource control for cross-radio access technology (RAT) scenarios. In some embodiments, the techniques of radio resource control are used for controlling sidelink radio resources for wireless communication of user data directly between two devices without going through a base station, such as vehicle to vehicle (V2V) communication, vehicle to pedestrian (V2P) communication, vehicle to device (V2D) communication, user equipment to user equipment communication, cell phone to cell phone communication, device to device (D2D) wireless communication, and the like. While V2V wireless communication is used as examples in the present disclosure, the examples can be suitably modified for other sidelink communication scenarios, such as vehicle to everything (V2X) communication, vehicle to pedestrian (V2P) communication, vehicle to device (V2D) communication, user equipment to user equipment communication, cell phone to cell phone communication, and the like.

In a cross-RAT scenario, two vehicles are respectively connected into two radio access networks with different radio access technologies. In some embodiments, a first vehicle is connected into an evolved packet system (EPS) that is deployed based on LTE technology, and a second vehicle is connected into a 5G system (5GS) that is deployed based on NR technology. In some examples, the EPS is deployed with evolved packet core (EPC) network and evolved universal terrestrial radio access (E-UTRA) network for air interface; and the 5GS is deployed with 5G core (5GC) network and 5G access network for air interface. To enable sidelink communication of user data directly between the two vehicles without going through base stations, coordination of sidelink resource control over the EPS and 5GS are performed in some examples. In some embodiments, the coordination of the sidelink resource control is through an application server system.

Figure 1:
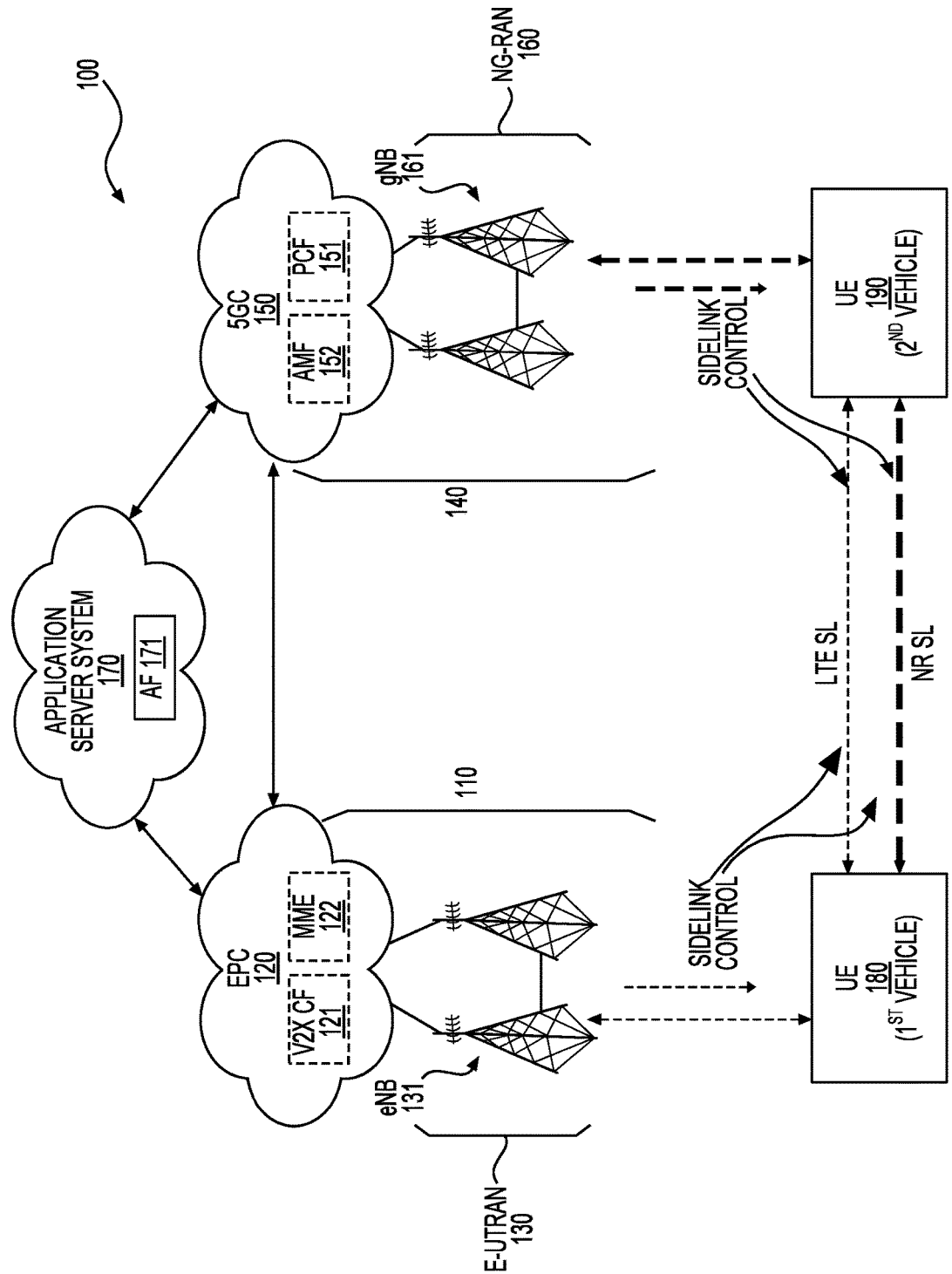
FIG. 1 shows a diagram of a wireless communication scenario according to some embodiments of the disclosure.

FIG. 1 shows a diagram of a cross-RAT wireless communication system 100 according to some embodiments of the disclosure. The cross-RAT wireless communication system 100 includes two access networks that are respectively connected to two core networks. Coordination over the two core networks are performed for sidelink resource control to enable sidelink communication between two user devices, such as two vehicles that are respectively connected to the two radio access networks.

Specifically, in the FIG. 1 example, the cross-RAT wireless communication system 100 includes a first sub-system 110 and a second sub-system 140. In some examples, the first sub-system 110 is an EPS 110 that is configured based on LTE technology, and the second sub-system 140 is a 5GS 140 that is configured based on the NR technology. For example, the EPS 110 includes an evolved packet core (EPC) network 120 and an evolved universal terrestrial radio access network (E-UTRAN) 130 for air interface, and the 5GS 140 includes a 5G core 5GC) network 150 and a next generation (NG) radio access network (NG-RAN) 160 for air interface. It is noted that the cross-RAT wireless communication system 100 can include other suitable sub-systems, such as an application server system 170 and the like. The sub-systems 110, 140 and 170 are suitably connected, for example by Internet, and the like to enable control signals and/or data communication among the sub-systems.

The E-UTRAN 130 includes one or more base stations that air-interface with user equipment using LTE technology and can provide control plane and user plane to user equipment. The base stations in the E-UTRAN 130 are generally fixed stations that communicate with the user equipment and are also referred to as other suitable terminology, such as evolved node-B (eNB), a base transceiver system, an access point and the like.

The NG-RAN 160 includes one or more base stations that air-interface with user equipment using NR technology and can provide control plane and user plane to user equipment. The base stations in the NG-RAN 160 are generally fixed stations that communicate with the user equipment and are also referred to as other suitable terminology, such as next generation Node-B (gNB), a base transceiver system, an access point and the like.

According to some aspects of the disclosure, a first user equipment (UE) 180 and a second UE 190 are respectively connected into the EPS 110 and the 5GS 140. For example, the first UE 180 is connected with the EPC 120 via the E-UTRAN 130, and the second UE 190 is connected with the 5GC 150 via the NG-RAN 160. In the FIG. 1 example, the first UE 180 is connected into the EPS 110 via an eNB 131, and the second UE 190 is connected into the 5GS 140 via a gNB 161.

Further, according to some aspects of the disclosure, the first UE 180 and the second UE 190 may perform data communication directly via a sidelink without going through a base station. In an example, both the first UE 180 and the second UE 190 support LTE technology and NR technology, and may communicate directly over a LTE sidelink or an NR sidelink based on coordination of the EPS 110 and 5GS 140 in the cross-RAT wireless communication system 100. In another example, the first UE 180 supports LTE technology, and the second UE 190 supports both LTE and NR technology, and the first UE 180 and the second UE 190 may communicate directly over a LTE sidelink based on coordination of the EPS 110 and 5GS 140 in the cross-RAT wireless communication system 100. In another example, the first UE 180 supports both LTE technology and NR technology, and the second UE 190 supports the NR technology, and the first UE 180 and the second UE 190 may communicate directly over an NR sidelink based on coordination of the EPS 110 and 5GS 140 in the cross-RAT wireless communication system 100. In some embodiments, the coordination oft the EPS 110 and 5GS 140 may go through a third party, such as the application server system 170 and the like.

It is noted that, in the FIG. 1 example, wireless signals in the LTE technology is shown with thin dash lines, and wireless signals in the NR technology is shown with thick dash lines.

The first UE 180 and the second UE 190 can be any suitable fixed devices or mobile devices, and may be referred to as other suitable terminology, such as mobile stations, user terminals, wireless devices, and the like. Following description uses a first vehicle 180 and a second vehicle 190 as an example of the first UE 180 and the second UE 190, and the description can be modified to suit for other devices.

The EPC network 120 includes various network elements. In some examples, the EPC network 120 includes a mobility management entity (MME) 122, serving gateways (not shown), packet data network (PDN) gateways (not shown), and some other network elements such as vehicle to everything control function (V2X-CF) 121, and the like.

It is noted that, in an example, each network element in the EPC network 120 can be implemented as circuits (e.g., processing circuitry, memory circuitry, input/output circuitry, and the like) or can be implemented as a processor that operates based on software instructions. In another example, a network element can be implemented as a server system with multiple servers. The multiple servers can be disposed at a location or can be distributed at different locations and are connected to work together as to appear as a single server to for example, user equipment. In another example, multiple network elements can be implemented by one physical component.

The serving gateways and the PDN gateways are configured for handling the user plane, such as transport data traffic between the user equipment and external networks of the EPS 110. The serving gateways are the points of interconnection between the E-UTRAN 130 and the EPC network 120. The serving gateways serve the user equipment by routing the incoming and outgoing IP packets in an example. The PDN gateways are the points of interconnection between the EPC network 120 and the external IP networks. The PDN gateways route packets to and from the packet data networks for example.

In some examples, the MME 122 is configured to handle with the control plane. For example, the MME 122 handles the signaling related to mobility and security for accessing E-UTRAN 130.

It is noted that, in some examples, the MME 122 and the serving gateways are combined into a network element for performing both functions.

The V2X-CF 121 is a network element for managing vehicle to everything (V2X) related services in a network. In an example, the V2X-CF assists with network relation actions, such as providing the user equipment (e.g., vehicle, terminal device, smart phone, and the like) with the parameters necessary to use V2X communications.

According to an aspect of the disclosure, the 5GC network 150 includes various service functions for providing services. In some examples, the 5GC network 150 includes a core access and mobility management function (AMF) 152, policy control function (PCF) 151, user plane function (UPF) (not shown), session management function (SMF) (not shown) and some other service functions, and the like. In an example, an application function (AF) is implemented as part of the operator network and thus in the 5GC network 150. In another example, an AF is implemented in the domain of a third party, such as in the application server system 170, in user equipment, and the like. FIG. 1 shows that the application server system 170 includes an AF 171.

It is noted that, in an example, each function in the 5GC network 150 can be implemented in circuits (e.g., processing circuitry, memory circuitry, input/output circuitry, and the like) or can be implemented as a processor that operates based on software instructions. In another example, a function can be implemented as a server system with multiple servers. The multiple servers can be disposed at a location or can be distributed at different locations and are connected to work together as to appear as a single server to external components, such as user equipment. In another example, multiple functions can be performed by one physical component.

In some examples, the UPF combines the functions of the serving gateways and the PDN gateways in the LTE technology.

In some examples, the AMF 152 receives connection and session related information from user equipment and is responsible for handling connection and mobility management tasks. It is noted that messages related to session management are forwarded to the SMF, and handled by the SMF.

In some examples, the PCF 151 provides policy rules for control plane functions, such as network slicing, roaming and mobility management. Further, the PCF 151 can access subscription information for policy decisions, and supports the quality of service (QoS) policy and charging control functions. In an example, the PCF 151 can provide sidelink resource policy and configuration parameters. It is noted that, in another example, the sidelink resource policy and configuration parameters can be provided by other suitable function in the 5GC network 150.

In some embodiments, user equipments use valide V2X policy and parameters provisioned by core networks for sidelink communication. For example, the V2X CF 121 can provide V2X policy and parameters for configuring LTE sidelinks for V2X communication; and the PCF 151 can provide V2X policy and parameters for configuring NR sidelinks for V2X communication.

According to an aspect of the disclosure, the EPC network 120 and the 5GC network 150 coordinate to provide suitable V2X policy and parameters to enable cross RAT radio resource control on the sidelink communication between the first UE 180 and the second UE 190. Some coordination procedures for cross-RAT sidelink control are shown in FIG. 2 and FIG. 3.

According to another aspect of the disclosure, the coordination of the EPC network 120 and the 5GC network 150 for providing suitable V2X policy and parameters go through the AF 171. In an example, the application server system 170 is a vehicle application server system 170 that provides V2X communication service. Some coordination procedures for cross-RAT sidelink control are shown in FIG.

Figure 5:
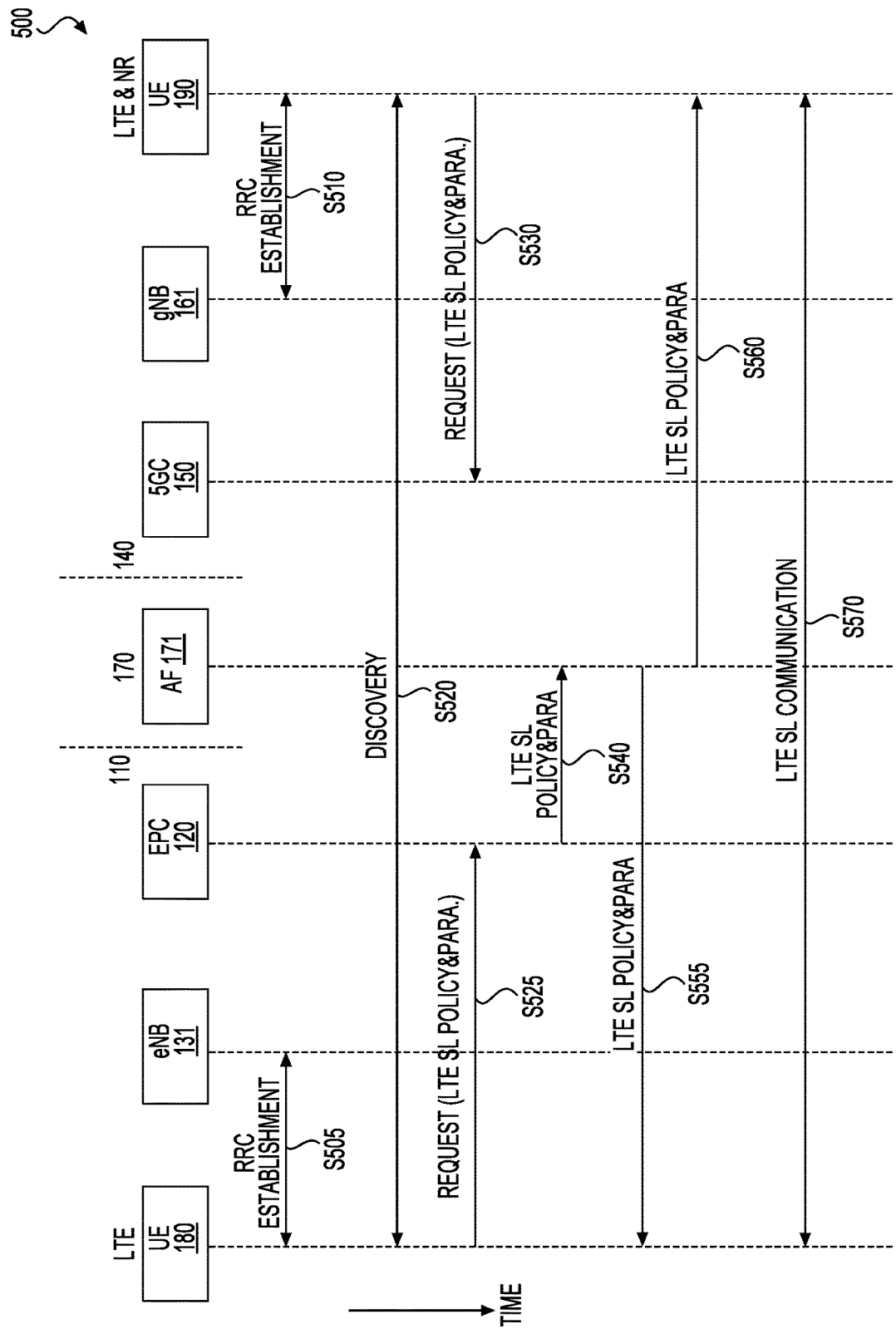
FIG. 5 shows another example for a coordination procedure for cross-RAT wireless communication according to an embodiment of the disclosure.

4 and FIG. 5. It is noted that the application server system 170 can include one or more servers. The one or more servers can be disposed at one location, or can be distributed at different locations and are suitably connected.

Figure 2:
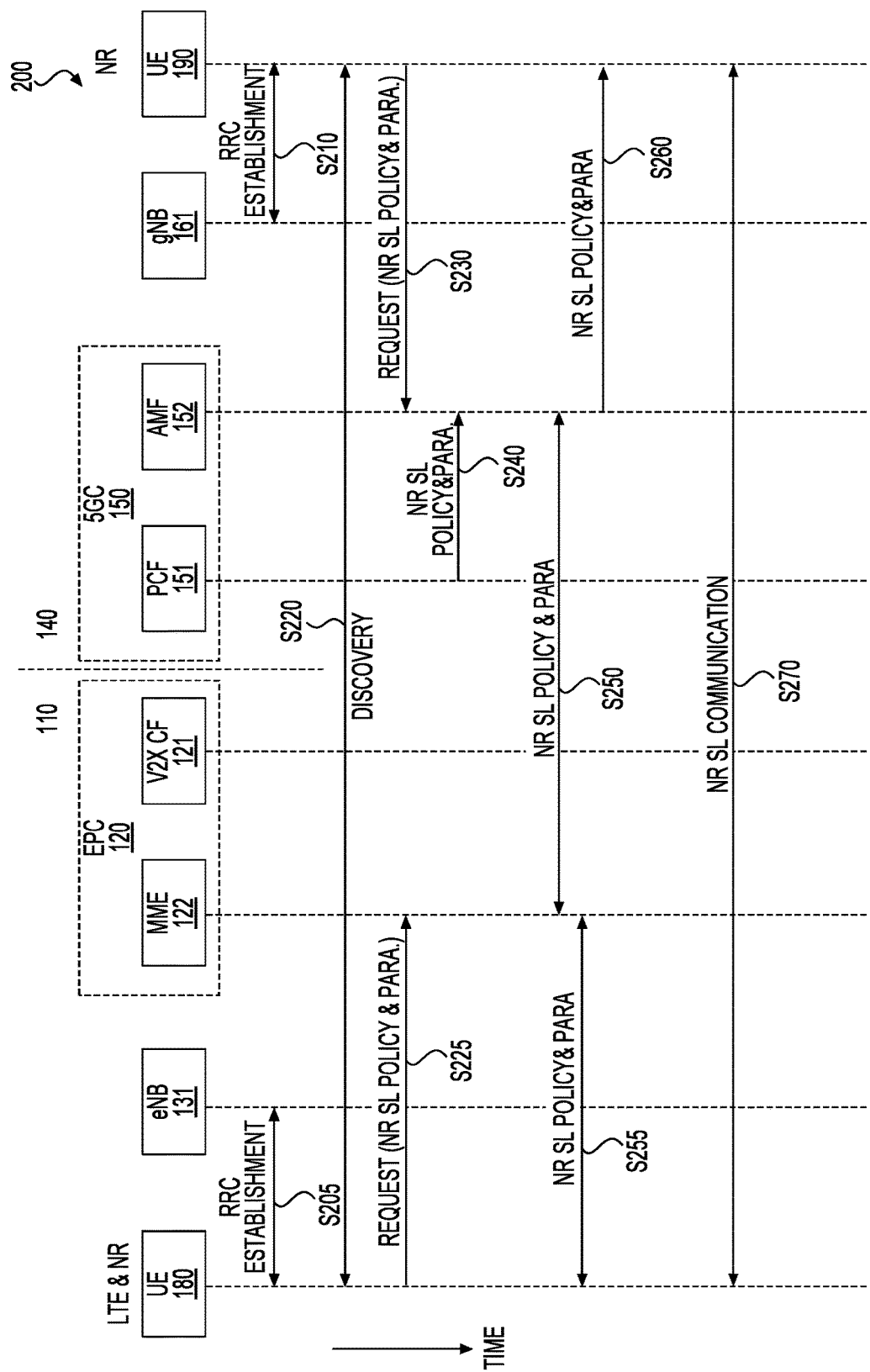
FIG. 2 shows an example for a coordination procedure for cross-RAT wireless communication according to an embodiment of the disclosure.
Figure 3:
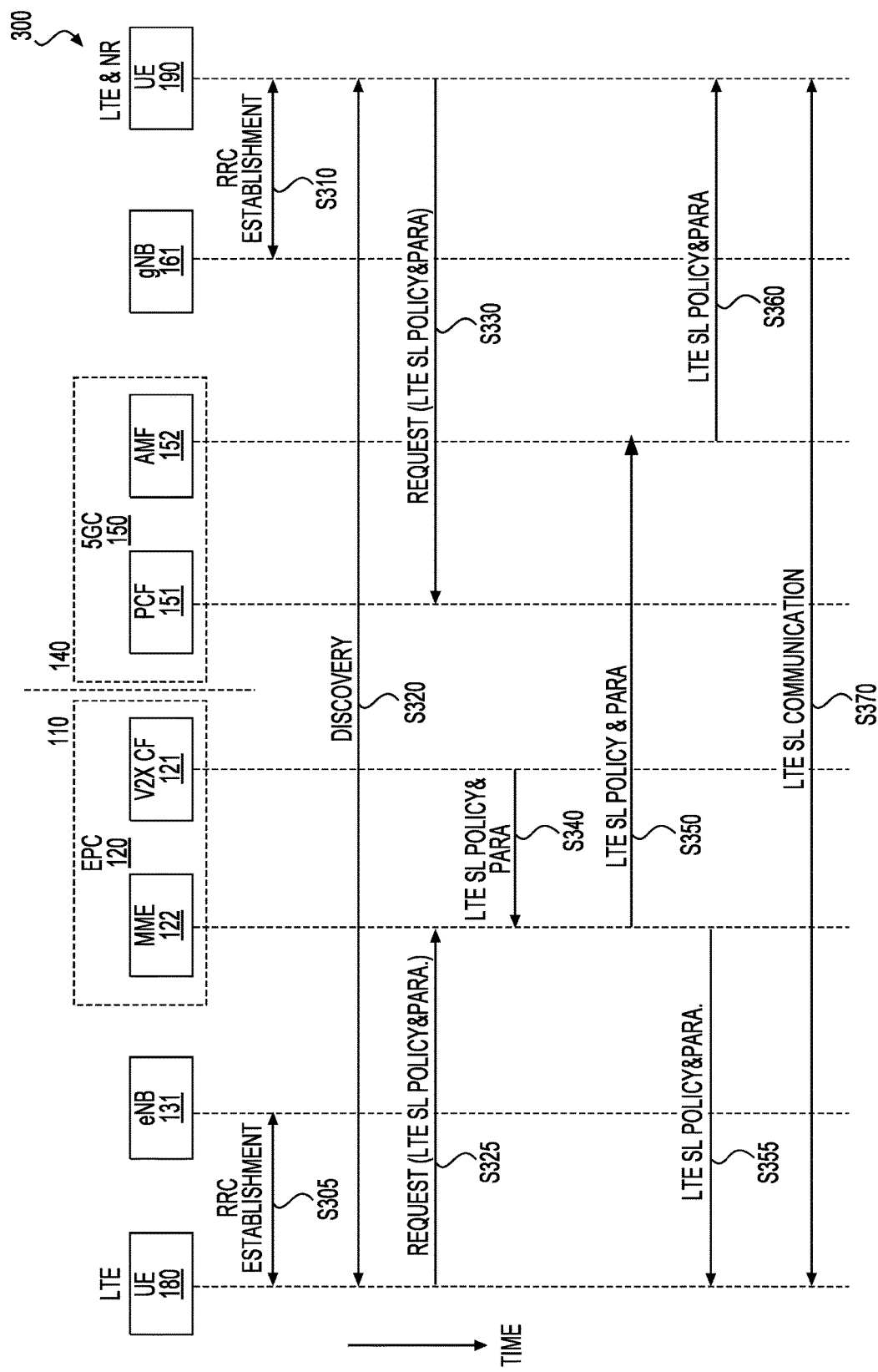
FIG. 3 shows another example for a coordination procedure for cross-RAT wireless communication according to an embodiment of the disclosure.

FIG. 2 shows an example of a coordination procedure 200 in the cross-RAT wireless communication system 100 according to an embodiment of the disclosure. The coordination procedure 200 enables the cross-RAT wireless communication system 100 to provide valid V2X policy and parameters to the first UE 180 and the second UE 190 for configuring sidelink communication. In the FIG. 2 example, the first UE 180 supports both LTE and NR technologies, and the second UE 190 supports NR technology.

At S205, the first UE 180 establishes a radio resource control (RRC) connection with the eNB 131, and is connected into the EPS 110.

At S210, the second UE 190 establishes an RRC connection with the gNB 161 and is connected into the 5GS 140. It is noted that S205 and S210 may happen at the same time or in a different sequence.

At S220, the first UE 180 and the second UE 190 respectively execute a V2X application. In an example, the first UE 180 performs a suitable discovery process to find the second UE 190 that is nearby for sidelink communication. In another example, the second UE 190 performs a suitable discovery process to find the first UE 180 that is nearby for sidelink communication. It is noted that, in the present disclosure, the discovery process can be any suitable discovery process, such as an in-application discovery process, a discovery process independent of applications, and the like. In the FIG. 2 example, NR technology is supported by both the first UE 180 and the second UE 190, and the NR technology is determined for use in sidelink communication between the first UE 180 and the second UE 190.

At S225, the first UE 180 checks whether valid V2X policy and parameters for NR technology is available at the first UE 180. When the first UE 180 does not have valid V2X policy and parameters, the first UE 180 sends a request to the EPC network 120. In an example, the MME 122 receives the request.

At S230, the second UE 190 checks whether valid V2X policy and parameters for the NR technology is available at the second UE 190. When the second UE 190 does not have valid V2X policy and parameters, the second UE 190 sends a request to the 5GC network 150. In an example, the AMF 152 receives the request.

At S240, the 5GC network 150 obtains valid V2X policy and parameters for the NR technology. In an example, the PCF 151 provides the valid V2X policy and parameters for the NR technology to the AMF 152. It is noted that, in another example, the valid V2X policy and parameters for the NR technology can be provided from other suitable network function to the AMF 152.

At S250, the EPC network 120 and the 5GC network 150 coordinates the cross RAT sidelink resource control. In an example, the MME 122 and the AMF 152 interact with suitable interfaces, such as via a PDN gateway, a UPF, and connections between the EPS 110 and the 5GS 140. For example, the AMF 152 provides the valid V2X policy and parameters for the NR technology to the MME 122.

At S255, the EPC network 120 provides the valid V2X policy and parameters for the NR technology to the first UE 180. In an example, the MME 122 provides the valid V2X policy and parameters for the NR technology to the first UE 180 via eNB 131. Then, the air interface between the eNB 131 and the first UE 180 carries, using the LTE technology, the valid V2X policy and parameters for the NR technology.

At S260, the 5GC network 150 provides the valid V2X policy and parameters for the NR technology to the second UE 190. In an example, the AMF 152 provides the valid V2X policy and parameters for the NR technology to the second UE 190 via gNB 161. Then, the air interface between the gNB 161 and the second UE 190 carries, using the NR technology, the valid V2X policy and parameters for the NR technology.

It is noted that S255 and S260 may be performed at the same time or in a different sequence. In some examples, S260 may be performed before S250 and after S240.

At S270, both the first UE 180 and the second UE 190 have valid V2X policy and parameters for NR technology, and thus can setup sidelink communication in the NR technology to transmit data in the user plane between the first UE 180 and the second UE 190 without go through the base stations.

FIG. 3 shows an example for a coordination procedure 300 in the cross-RAT wireless communication system 100 according to an embodiment of the disclosure. The coordination procedure 300 enables the cross-RAT wireless communication system 100 to provide valid V2X policy and parameters to the first UE 180 and the second UE 190 for sidelink communication. In the FIG. 3 example, the first UE 180 supports the LTE technology, and the second UE 190 supports both LTE and NR technologies.

At S305, the first UE 180 establishes a radio resource control (RRC) connection with the eNB 131, and is connected into the EPS 110.

At S310, the second UE 190 establishes an RRC connection with the gNB 161 and is connected into the 5GS 140. It is noted that S305 and S310 may happen at the same time or in a different sequence.

At S320, the first UE 180 and the second UE 190 respectively execute a V2X application. In an example, the first UE 180 performs a suitable discovery process to find the second UE 190 that is nearby for sidelink communication. In another example, the second UE 190 performs a suitable discovery process to find the first UE 180 that is nearby for sidelink communication. It is noted that, in the present disclosure, the discovery process can be any suitable discovery process, such as an in-application discovery process, a discovery process independent of applications, and the like. In the FIG. 3 example, the LTE technology is supported by both the first UE 180 and the second UE 190, and the LTE technology is determined for use in sidelink communication between the first UE 180 and the second UE 190.

At S325, the first UE 180 checks whether valid V2X policy and parameters for the LTE technology is available at the first UE 180. When the first UE 180 does not have valid V2X policy and parameters, the first UE 180 sends a request to the EPC network 120. In an example, the MME 122 receives the request.

At S330, the second UE 190 checks whether valid V2X policy and parameters for LTE technology is available at the second UE 190. When the second UE 190 does not have valid V2X policy and parameters, the second UE 190 sends a request to the 5GC network 150. In an example, the AMF 152 receives the request.

At S340, the EPC network 120 obtains valid V2X policy and parameters for the LTE technology. In an example, the V2X CF 121 provides the valid V2X policy and parameters for the LTE technology to the MME 122.

At S350, the EPC network 120 and the 5GC network 150 coordinate the cross RAT sidelink resource control. In an example, the MME 122 and the AMF 152 interact with suitable interfaces, such as via a PDN gateway, a UPF, and connections between the EPS 110 and the 5GS 140. In an example, the MME 122 provides the valid V2X policy and parameters for LTE technology to the AMF 152.

At S355, the EPC network 120 provides the valid V2X policy and parameters for the LTE technology to the first UE 180. In an example, the MME 122 provides the valid V2X policy and parameters for LTE technology to the first UE 180 via eNB 131. Then, the air interface between the eNB 131 and the first UE 180 carries, using the LTE technology, the valid V2X policy and parameters for LTE technology.

At S360, the 5GC network 150 provides the valid V2X policy and parameters for the LTE technology to the second UE 190. In an example, the AMF 152 provides the valid V2X policy and parameters for LTE technology to the second UE 190 via gNB 161. Then, the air interface between the gNB 161 and the second UE 190 carries, using the NR technology, the valid V2X policy and parameters for LTE technology.

It is noted that S355 and S360 may be performed at the same time or in a different sequence. In another example, S355 is performed before S350 and after S340.

At S370, both the first UE 180 and the second UE 190 have valid V2X policy and parameters for the LTE technology, and thus can setup sidelink communication in the LTE technology to transmit data in the user plane between the first UE 180 and the second UE 190 without go through the base stations.

It is noted that, in another example, both the first UE 180 and the second UE 190 support both LTE and NR technology. During the discovery step, one of the first UE 180 and the second UE 190 may determine the technology for the sidelink communication. When the NR technology is determined for the sidelink communication, the coordination procedure is similar to the coordination procedure 200; and when the LTE technology is determined for the sidelink communication, the coordination procedure is similar to the coordination procedure 300.

Figure 4:
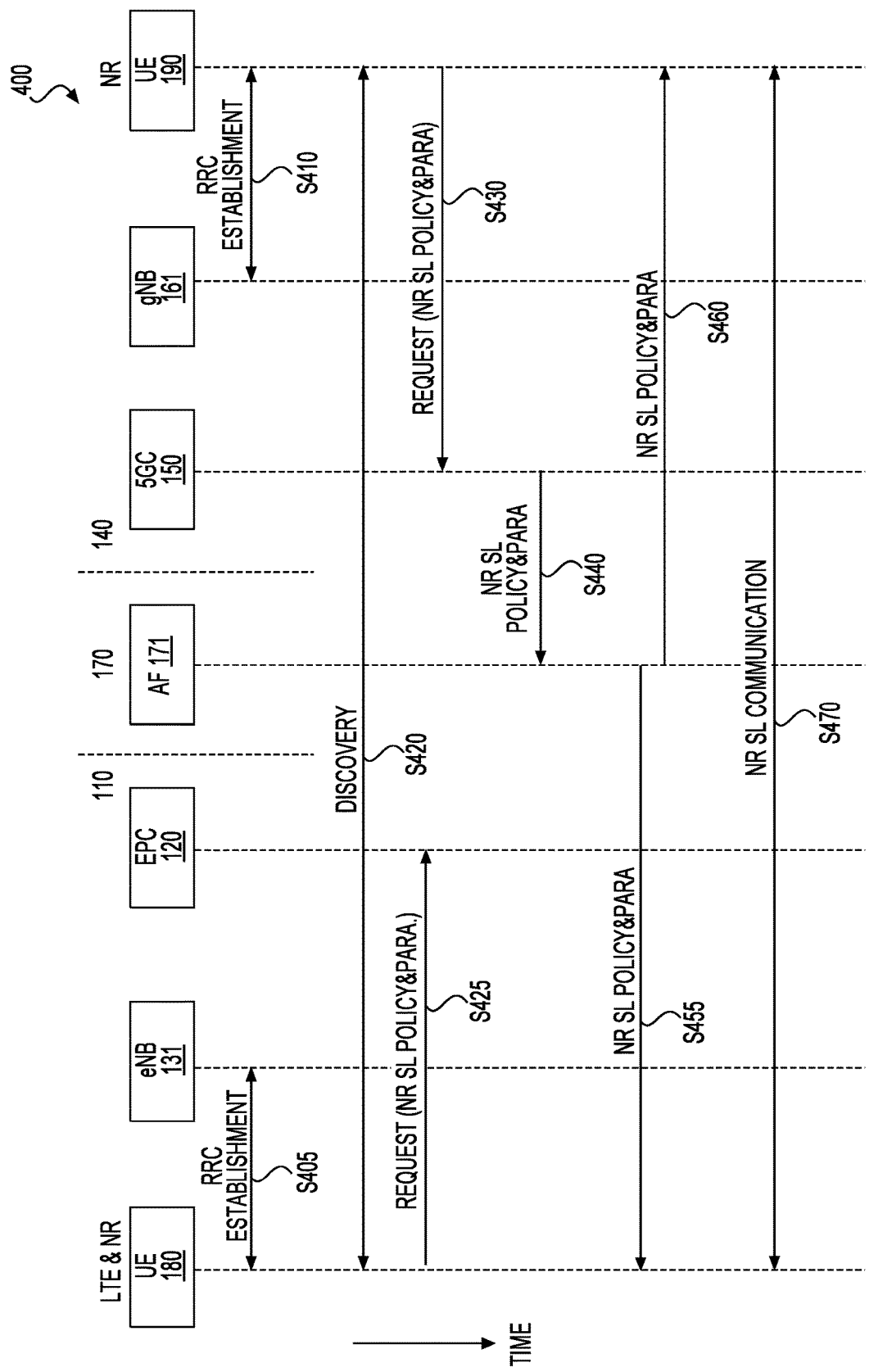
FIG. 4 shows another example for a coordination procedure for cross-RAT wireless communication according to an embodiment of the disclosure.

FIG. 4 shows an example for a coordination procedure 400 in the cross-RAT wireless communication system 100 according to an embodiment of the disclosure. The coordination procedure 400 enables the cross-RAT wireless communication system 100 to provide valid V2X policy and parameters to the first UE 180 and the second UE 190 for sidelink communication. In the FIG. 4 example, the first UE 180 supports both LTE and NR technologies, and the second UE 190 supports NR technology.

At S405, the first UE 180 establishes a radio resource control (RRC) connection with the eNB 131, and is connected into the EPS 110.

At S410, the second UE 190 establishes an RRC connection with the gNB 161 and is connected into the 5GS 140. It is noted that S505 and S510 may happen at the same time or in a different sequence.

At S420, the first UE 180 and the second UE 190 respectively execute a V2X application. For example, the first UE 180 and the second UE 190 are connected with the application server system 170 and executes functions provided by the AF 171. In an example, the first UE 180 performs a suitable discovery process to find the second UE 190 that is nearby for sidelink communication. In another example, the second UE 190 performs a suitable discovery process to find the first UE 180 that is nearby for sidelink communication. It is noted that, in the present disclosure, the discovery process can be any suitable discovery process, such as an in-application discovery process, a discovery process independent of applications, and the like. In the FIG. 4 example, NR technology is supported by both the first UE 180 and the second UE 190, and the NR technology is determined for use in sidelink communication between the first UE 180 and the second UE 190.

At S425, the first UE 180 checks whether valid V2X policy and parameters for NR technology is available at the first UE 180. When the first UE 180 does not have valid V2X policy and parameters, the first UE 180 sends a request to the EPC network 120. In an example, the MME 122 receives the request.

At S430, the second UE 190 checks whether valid V2X policy and parameters for NR technology is available at the second UE 190. When the second UE 190 does not have valid V2X policy and parameters, the second UE 190 sends request to the 5GC network 150. In an example, the AMF 152 receives the request.

At S440, the 5GC network 150 obtains valid V2X policy and parameters for the NR technology, and provides to the AF 171 in the application server system 170. In an example, the PCF 151 provides the valid V2X policy and parameters for the NR technology to the AMF 152. The AMF 152 interacts with suitable interfaces, such as via a PDN gateway, and connections between the 5GS 140 and the application server system 170 to provide the valid V2X policy and parameters for the NR technology to the AF 171. In some embodiments, the EPC network 120 obtains valid V2X policy and parameters for the LTE technology, and provides to the AF 171 in the application server system 170. In an example, the V2X CF 121 provides the valid V2X policy and parameters for the LTE technology to the MME 122. The MME 122 interacts with suitable interfaces, such as via UPN, and connections between the EPS 110 and the application server system 170 to provide the valid V2X policy and parameters for the LTE technology to the AF 171.

At S455, the application server system 170 provides the valid V2X policy and parameters for NR technology to the first UE 180, for example in the application layer. In an example, a channel in the application layer is setup between the application server system 170 and the first UE 180, and the valid V2X policy and parameters for NR technology is included in a message and provided via the channel from the AF 171 to the first UE 180. It is noted that, in some examples, suitably encryption and authentication techniques are used on the message. It is noted that in some examples, the application server system 170 also provides the valid V2X policy and parameters for the LTE technology to the first UE 180, for example in the application layer At S460, the application server system 170 provides the valid V2X policy and parameters for the NR technology to the second UE 190, for example in the application layer. In an example, a channel in the application layer is setup between the application server system 170 and the second UE 190, and the valid V2X policy and parameters for NR technology is included in a message and provided via the channel from the AF 171 to the second UE 190. It is noted that, in some examples, suitably encryption and authentication techniques are used on the message. It is noted that in some examples, the application server system 170 provides the valid V2X policy and parameters for the LTE technology to the second UE 190, for example in the application layer.

It is noted that S455 and S460 may be performed at the same time or in a different order.

At S470, both the first UE 180 and the second UE 190 have valid V2X policy and parameters for NR technology, and thus can setup sidelink communication in the NR technology to transmit data in the user plane between the first UE 180 and the second UE 190 without go through the base stations.

FIG. 5 shows an example for a coordination procedure 500 in the cross-RAT wireless communication system 100 according to an embodiment of the disclosure. The coordination procedure 500 enables the cross-RAT wireless communication system 100 to provide valid V2X policy and parameters to the first UE 180 and the second UE 190 for sidelink communication. In the FIG. 5 example, the first UE 180 supports both LTE technology, and the second UE 190 supports both LTE and NR technologies.

At S505, the first UE 180 establishes a radio resource control (RRC) connection with the eNB 131, and is connected into the EPS 110.

At S510, the second UE 190 establishes an RRC connection with the gNB 161 and is connected into the 5GS 140. It is noted that S505 and S510 may happen at the same time or in a different sequence.

At S520, the first UE 180 and the second UE 190 respectively execute a V2X application. In an example, the first UE 180 performs a suitable discovery process to find the second UE 190 that is nearby for sidelink communication. In another example, the second UE 190 performs a suitable discovery process to find the first UE 180 that is nearby for sidelink communication. It is noted that, in the present disclosure, the discovery process can be any suitable discovery process, such as an in-application discovery process, a discovery process independent of applications, and the like. In the FIG. 5 example, the LTE technology is supported by both the first UE 180 and the second UE 190, and the LTE technology is determined for use in sidelink communication between the first UE 180 and the second UE 190.

At S525, the first UE 180 checks whether valid V2X policy and parameters for LTE technology is available at the first UE 180. When the first UE 180 does not have valid V2X policy and parameters, the first UE 180 sends a request to the EPC network 120. In an example, the MME 122 receives the request.

At S530, the second UE 190 checks whether valid V2X policy and parameters for LTE technology is available at the second UE 190. When the second UE 190 does not have valid V2X policy and parameters, the second UE 190 sends a request to the 5GC network 150. In an example, the AMF 152 receives the request.

At S540, the EPC network 120 obtains valid V2X policy and parameters for the LTE technology, and provides to the AF 171 in the application server system 170. In an example, the V2X CF 121 provides the valid V2X policy and parameters for the LTE technology to the MME 122. The MME 122 interacts with suitable interfaces, such as via UPN, and connections between the EPS 110 and the application server system 170 to provide the valid V2X policy and parameters for the LTE technology to the AF 171. In some embodiments, the 5GC network 150 obtains valid V2X policy and parameters for the NR technology, and provides to the AF 171 in the application server system 170. In an example, the PCF 151 provides the valid V2X policy and parameters for the NR technology to the AMF 152. The AMF 152 interacts with suitable interfaces, such as via a PDN gateway, and connections between the 5GS 140 and the application server system 170 to provide the valid V2X policy and parameters for the NR technology to the AF 171.

At S555, the application server system 170 provides the valid V2X policy and parameters for the LTE technology to the first UE 180, for example in the application layer. In an example, a channel in the application layer is setup between the application server system 170 and the first UE 180, and the valid V2X policy and parameters for the LTE technology is included in a message and provided via the channel from the AF 171 to the first UE 180. It is noted that, in some examples, suitably encryption and authentication techniques are used on the message. It is noted that, in some examples, the application server system 170 provides the valid V2X policy and parameters for the NR technology to the first UE 180, for example in the application layer.

At S560, the application server system 170 provides the valid V2X policy and parameters for the LTE technology to the second UE 190, for example in the application layer. In an example, a channel in the application layer is setup between the application server system 170 and the second UE 190, and the valid V2X policy and parameters for the LTE technology is included in a message and provided via the channel from the AF 171 to the second UE 190. It is noted that, in some examples, suitably encryption and authentication techniques are used on the message. It is noted that, in some examples, the application server system 170 provides the valid V2X policy and parameters for the NR technology to the second UE 190, for example in the application layer.

It is noted that S555 and S560 may be performed at the same time or in a different sequence.

At S570, both the first UE 180 and the second UE 190 have valid V2X policy and parameters for the LTE technology, and thus can setup sidelink communication in the LTE technology to transmit data in the user plane between the first UE 180 and the second UE 190 without go through the base stations.

It is noted that, in another example, both the first UE 180 and the second UE 190 support both LTE and NR technology. During the discovery step, one of the first UE 180 and the second UE 190 may determine the technology for the sidelink communication. When the NR technology is determined for the sidelink communication, the coordination procedure is similar to the coordination procedure 400; and when the LTE technology is determined for the sidelink communication, the coordination procedure is similar to the coordination procedure 500.

Figure 6:
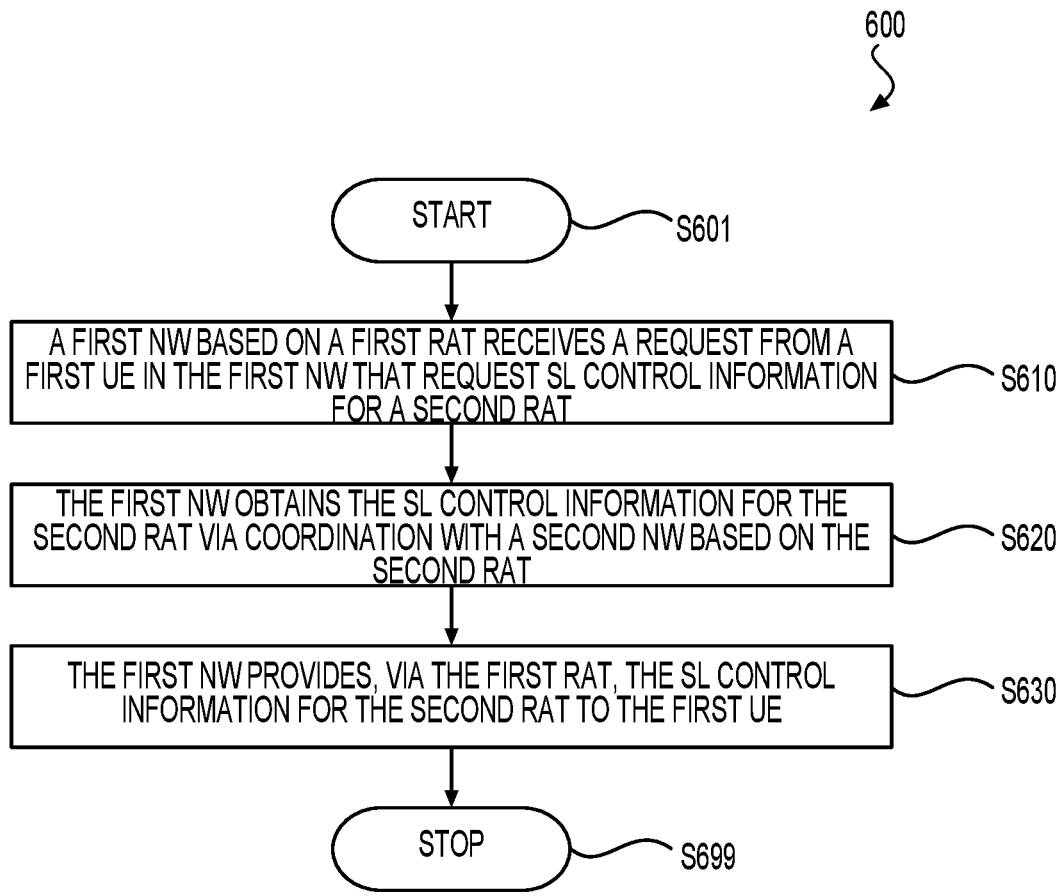
FIG. 6 shows a flow chart outlining a process example for cross-RAT wireless communication according to an embodiment of the disclosure.

FIG. 6 shows a flow chart outlining a process 600 according to an embodiment of the disclosure. The process 600 is executed by a first network, such as the EPS 110, the 5GS 140, and the like. In some examples, the process 600 is executed by circuitry, such processing circuitry, transceiver circuitry, and the like. In some examples, one or more processors execute software instructions stored in memory circuitry to execute the process 600. The process starts at S601 and proceeds to S610.

At S610, the first network receives a request from a first UE. The first network is based on a first RAT. The first UE is connected with the first network based on the first RAT. The request requests sidelink control information for a second RAT.

At S620, first network obtains the sidelink control information for the second RAT. In some examples, the first network coordinates with a second network that is based on the second RAT to receive the sidelink control information for the second RAT from the second network.

At S630, the first network provides, via the first RAT, the sidelink control information for the second RAT to the first UE. Thus, in some examples, the first UE can setup a sidelink in the second RAT with a second UE in the second network. Then, the process proceeds to S699 and terminates.

Figure 7:
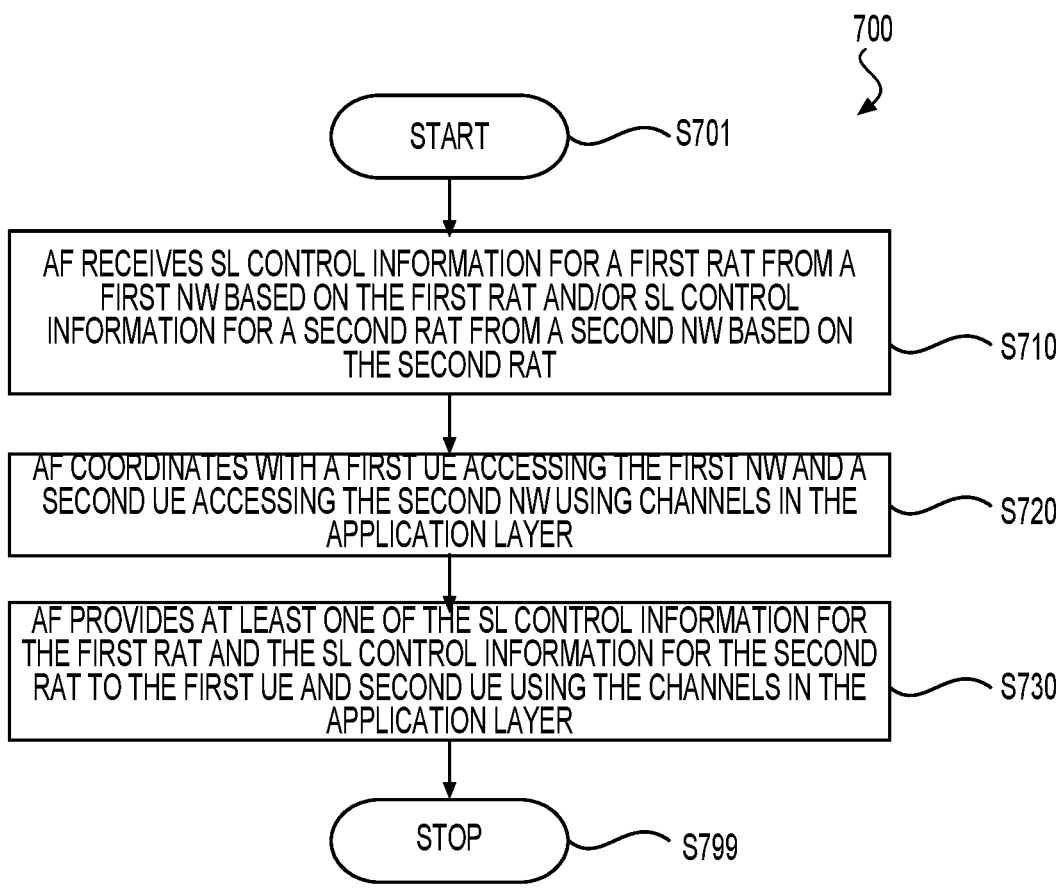
FIG. 7 shows another flow chart outlining a process example for cross-RAT wireless communication according to an embodiment of the disclosure.

FIG. 7 shows a flow chart outlining a process 700 according to an embodiment of the disclosure. The process 700 is executed by an application function, such as the AF 171 in the application server system 170, and the like. In some examples, the process 700 is executed by circuitry, such processing circuitry, transceiver circuitry, and the like. In some examples, one or more processors execute software instructions stored in memory circuitry to execute the process 700. The process starts at S701 and proceeds to S710.

At S710, the AF receives sidelink control information for a first RAT from a first network based on a first RAT and/or sidelink control information for a second RAT from a second network based on a second RAT. In an example, the EPC 120 receives a request from the UE 180 for sidelink control information for LTE. In response to the request, the EPC 120 provides the sidelink control information for LTE to the AF 171. In an example, when the EPC 120 receives a request from the UE 180 for sidelink control information for NR, the EPC 120 does not have the sidelink control information for NR, and may forward the request to the AF 171. It is noted that, the EPC 120 can forward the request for the sidelink control information of NR to the AF 171, and provides the sidelink control information for LTE to the AF 171. In an example, the 5GC 150 receives a request from the UE 190 for sidelink control information for NR. In response to the request, the 5GC 150 provides the sidelink control information for NR to the AF 171. In an example, when the 5GC 150 receives a request from the UE 190 for sidelink control information for LTE, the 5GC 150 does not have the sidelink control information for LTE, and may forward the request to the AF 171. It is noted that, the 5GC 150 can forward the request for the sidelink control information of LTE to the AF 171, and provides the sidelink control information for NR to the AF 171.

At S720, the AF coordinates with a first UE accessing the first NW and a second UE accessing the second UE using channels in the application layer. In an example, the application layer contains the communications protocols and interface methods used in process-to-process communications across, for, example, an Internet Protocol (IP) computer network. The application layer standardizes communication and depends upon the underlying transport layer protocols to establish host-to-host data transfer channels and manage the data exchange in a client-server or peer-to-peer networking model. For example, a first channel is setup between the AF 171 and the first UE 180, messages are sent between the AF 171 and the first UE 180 by the first channel. The messages can be suitably encrypted, thus although the eNB 131 may transmit and receive signals carrying the messages, but is not able to decrypt messages in an example. Similarly, a second channel is setup between the AF 171 and the second UE 190, messages are sent between the AF 171 and the second UE 190 by the second channel.

At S730, the AF provides at least one of the sidelink control information for the first RAT and the sidelink control information for the second RAT to the first UE and the second UE using the channels in the application layer. In an example, the AF 171 provides the sidelink control information for LTE to the first UE 180 via the first channel and provides the sidelink control information for the LTE to the second UE 190 via the second channel. Thus, the first UE 180 and the second UE 190 can setup LTE sidelink. In another example, the AF 171 provides the sidelink control information for NR to the first UE 180 via the first channel and provides the sidelink control information for the NR to the second UE 190 via the second channel. Thus, the first UE 180 and the second UE 190 can setup NR sidelink. In another example, the AF 171 provides the sidelink control information for LTE and NR to the first UE 180 via the first channel and provides the sidelink control information for the LTE and NR to the second UE 190 via the second channel. Thus, the first UE 180 and the second UE 190 can setup LTE or NR sidelink. Then, the process proceeds to S799 and terminates.

Figure 8:
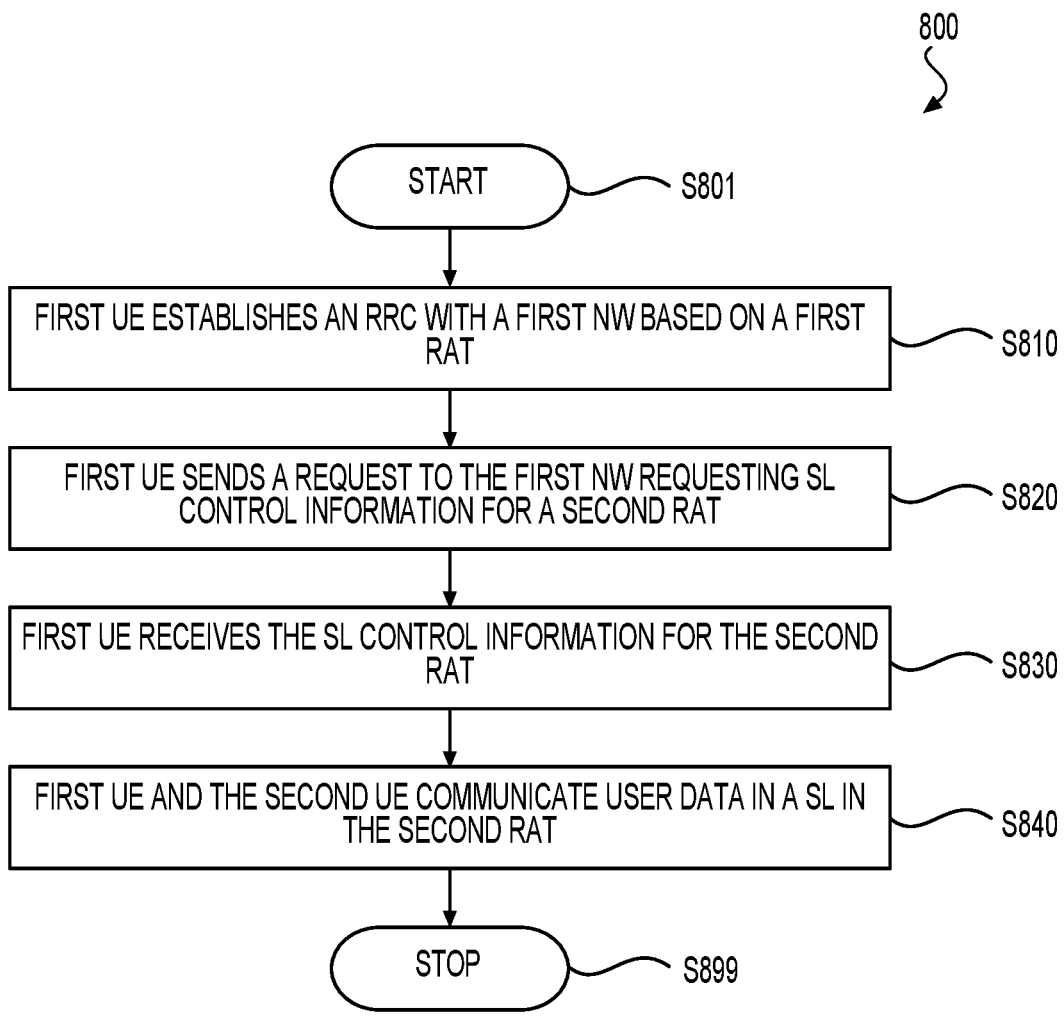
FIG. 8 shows a flow chart outlining a process example for cross-RAT wireless communication according to an embodiment of the disclosure.

FIG. 8 shows a flow chart outlining a process 800 according to an embodiment of the disclosure. The process 800 is executed by an UE, such as the first UE 180, the second UE 190 and the like. In some examples, the process 800 is executed by circuitry in the UE, such processing circuitry, transceiver circuitry, and the like. In some examples, one or more processors in the UE execute software instructions stored in memory circuitry to execute the process 800. The process starts at S801 and proceeds to S810.

At S810, a first UE establishes an RRC with a first NW based on a first RAT. In an example, the first UE 180 in the FIG. 1 example establishes an RRC with the E-UTRAN 130 based on LTE, and is then connected into the EPS 110. The second UE 190 in the FIG. 1 example establishes an RRC with NG-RAN 160, and is then connected into the 5GS 140.

At S820, the first UE sends a request to the first NW requesting sidelink control information for a second RAT. In an example, the first UE 180 and the second UE 190 conduct a discovery process, and decides to setup NR sidelink between the first UE 180 and the second UE 190. The first UE 180 checks whether the first UE 180 has valid sidelink control information for NR, and sends a request for valide sidelink control information for NR to the EPC 120.

At S830, the first UE receives the sidelink control information for the second RAT. In an example, the EPC 120 and the 5GC 150 coordinate, and the 5GC 150 provides the valid sidelink control information (e.g., sidelink policy and parameters) for NR to the EPC 120, and the EPC 120 provides the valid sidelink control information for NR to the first UE 180. In another example, the 5GC 150 provides the valid sidelink control information for NR to the AF 171, and then the AF 171 then sends the valid sidelink control information for NR to the first UE 180 via a channel in the application layer. The AF 171 may also sends the valid sidelink control information for NR to the second UE 190 via a channel in the application layer.

At S840, the first UE and the second UE set up a sidelink of the second RAT based on the sidelink control information for the second RAT, and transmit user data in the sidelink. Then, the process proceeds to S899 and terminates.

Figure 9:
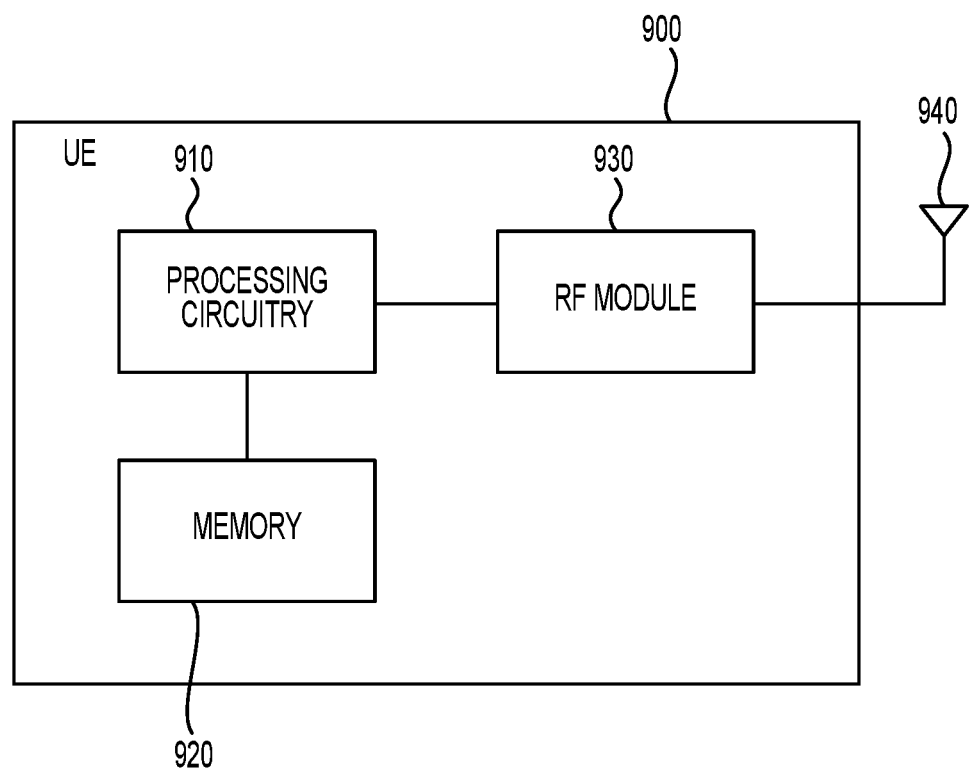
FIG. 9 shows a diagram of a user equipment according to an embodiment of the disclosure.

FIG. 9 shows a block diagram of a UE 900 according to embodiments of the disclosure. In an example, the first UE 180 and the second UE 190 can be respectively configured in the same manner as the UE 900. The UE 900 can be configured to perform various functions in accordance with one or more embodiments or examples described herein. Thus, the UE 900 can provide means for implementation of techniques, processes, functions, components, systems described herein. For example, the UE 900 can be used to implement functions of the first UE 180 or the second UE 190 in various embodiments and examples described herein. The UE 900 can be a general purpose computer in some embodiments, and can be a device including specially designed circuits to implement various functions, components, or processes described herein in other embodiments. The UE 900 can include processing circuitry 910, a memory 920, a radio frequency (RF) module 930, and an antenna 940.

In various examples, the processing circuitry 910 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 910 can be a central processing unit (CPU) configured to execute program instructions to perform various functions and processes described herein. Accordingly, the memory 920 can be configured to store program instructions. The processing circuitry 910, when executing the program instructions, can perform the functions and processes. The memory 920 can further store other programs or data, such as operating systems, application programs, and the like. The memory can include transitory or non-transitory storage medium. The memory 920 can include a read only memory (ROM), a random access memory (RAM), a flash memory, a solid state memory, a hard disk drive, an optical disk drive, and the like.

The RF module 930 receives processed data signal from the processing circuitry 910 and transmits the signal in a beam-formed wireless communication network via an antenna 940, or vice versa. The RF module 930 can include a digital to analog convertor (DAC), an analog to digital converter (ADC), a frequency up convertor, a frequency down converter, filters, and amplifiers for reception and transmission operations. The RF module 930 can include multi-antenna circuitry (e.g., analog signal phase/amplitude control units) for beamforming operations. The antenna 940 can include one or more antenna arrays.

The UE 900 can optionally include other components, such as input and output devices, additional or signal processing circuitry, and the like. Accordingly, the UE 900 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

When implemented in hardware, the hardware may comprise one or more of discrete components, an integrated circuit, an application-specific integrated circuit (ASIC), etc. While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of sidelink resource control, comprising:
receiving, by processing circuitry of a first core network configured based on a first radio access technology, a sidelink control request from a first user equipment that accesses the first core network using the first radio access technology, the sidelink control request requesting sidelink control information for a second radio access technology that is not supported by the first core network;
obtaining the sidelink control information for the second radio access technology directly from a second core network outside the first core network, the second core network being configured based on the second radio access technology, and the sidelink control information for the second radio access technology being provisioned by the second core network; and
providing, via the first radio access technology and in response to the sidelink control request, the obtained sidelink control information for the second radio access technology, to the first user equipment, the sidelink control information being used to configure a sidelink between the first user equipment and a second user equipment using the second radio access technology.

2. The method of claim 1, wherein the first radio access technology is evolved universal terrestrial radio access (E-UTRA) technology, and the second radio access technology is new radio (NR) technology.

3. The method of claim 1, wherein the first radio access technology is new radio (NR) technology, and the second radio access technology is evolved universal terrestrial radio access (E-UTRA) technology.

4. The method of claim 1, further comprising:
acquiring, from a control function server in the first core network, sidelink control information for the first radio access technology.

5. The method of claim 4, further comprising:
communicating with the second core network to provide the sidelink control information for the first radio access technology to the second core network, such that the sidelink control information for the first radio access technology is obtainable by another user equipment from the second core network via the second radio access technology.

6. The method of claim 1, wherein
the first radio access technology is evolved universal terrestrial radio access (E-UTRA) technology,
the second radio access technology is new radio (NR) technology, and
the obtaining the sidelink control information for the second radio access technology is performed by a mobility management entity (MME) in the first core network receiving the sidelink control information for the second radio access technology from an Access and Mobility Management Function (AMF) in the second core network.

7. The method of claim 1, wherein
the first radio access technology is new radio (NR) technology,
the second radio access technology is evolved universal terrestrial radio access (E-UTRA) technology, and
the obtaining the sidelink control information for the second radio access technology is performed by an Access and Mobility Management Function (AMF) in the first core network receiving the sidelink control information for the second radio access technology from a mobility management entity (MME) in the second core network.

8. A wireless communication system, comprising:
processing circuitry of the wireless communication system that corresponds to a first core network configured based on a first radio access technology, the processing circuitry being configured to:
receive a sidelink control request from a first user equipment that accesses the first core network using the first radio access technology, the sidelink control request requesting sidelink control information for a second radio access technology that is not supported by the first core network;
obtain the sidelink control information for the second radio access technology directly from a second core network outside the first core network, the second core network being configured based on the second radio access technology, and the sidelink control information for the second radio access technology being provisioned by the second core network; and
provide, via the first radio access technology and in response to the sidelink control request, the obtained sidelink control information for the second radio access technology, to the first user equipment, the sidelink control information being used to configure a sidelink between the first user equipment and a second user equipment using the second radio access technology.

9. The wireless communication system of claim 8, wherein the first radio access technology is evolved universal terrestrial radio access (E-UTRA) technology, and the second radio access technology is new radio (NR) technology.

10. The wireless communication system of claim 8, wherein the first radio access technology is new radio (NR) technology, and the second radio access technology is evolved universal terrestrial radio access (E-UTRA) technology.

11. The wireless communication system of claim 8, wherein the processing circuitry is further configured to:
acquire, from a control function server in the wireless communication system, sidelink control information for the first radio access technology.

12. The wireless communication system of claim 11, wherein the processing circuitry is further configured to:
communicate with the second core network to provide the sidelink control information for the first radio access technology to the second core network, such that the sidelink control information for the first radio access technology is obtainable by another user equipment from the second core network via the second radio access technology.

13. The wireless communication system of claim 8, wherein
the first radio access technology is evolved universal terrestrial radio access (E-UTRA) technology,
the second radio access technology is new radio (NR) technology, and
the processing circuitry is included in a mobility management entity (MME) in the first core network and is configured to receive the sidelink control information for the second radio access technology from an Access and Mobility Management Function (AMF) in the second core network.

14. The wireless communication system of claim 8, wherein
the first radio access technology is new radio (NR) technology,
the second radio access technology is evolved universal terrestrial radio access (E-UTRA) technology, and
the processing circuitry is included in an Access and Mobility Management Function (AMF) in the first core network and is configured to receive the sidelink control information for the second radio access technology from a mobility management entity (MME) in the second core network.

15. A non-transitory computer-readable medium storing instructions which when executed by processing circuitry of a first core network configured based on a first radio access technology cause the processing circuitry to perform:
receiving a sidelink control request from a first user equipment that accesses the first core network using the first radio access technology, the sidelink control request requesting sidelink control information for a second radio access technology that is not supported by the first core network;
obtaining the sidelink control information for the second radio access technology directly from a second core network outside the first core network, the second core network being configured based on the second radio access technology, and the sidelink control information for the second radio access technology being provisioned by the second core network; and
providing, via the first radio access technology and in response to the sidelink control request, the obtained sidelink control information for the second radio access technology, to the first user equipment, the sidelink control information being used to configure a sidelink between the first user equipment and a second user equipment using the second radio access technology.

16. The non-transitory computer-readable medium of claim 15, wherein
the first radio access technology is evolved universal terrestrial radio access (E-UTRA) technology, and the second radio access technology is new radio (NR) technology; or
the first radio access technology is the NR technology, and the second radio access technology is the E-UTRA technology.

17. The non-transitory computer-readable medium of claim 15, wherein the instructions which when executed by the processing circuitry further cause the processing circuitry to perform:
acquiring, from a control function server in the first core network, sidelink control information for the first radio access technology.

18. The non-transitory computer-readable medium of claim 16, wherein the instructions which when executed by the processing circuitry further cause the processing circuitry to perform:

communicating with the second core network to provide the sidelink control information for the first radio access technology to the second core network, such that the sidelink control information for the first radio access technology is obtainable by another user equipment from the second core network via the second radio access technology.

19. The non-transitory computer-readable medium of claim 15, wherein
the first radio access technology is evolved universal terrestrial radio access (E-UTRA) technology,
the second radio access technology is new radio (NR) technology, and
the processing circuitry is included in a mobility management entity (MME) in the first core network, and
the obtaining the sidelink control information for the second radio access technology comprises receiving the sidelink control information for the second radio access technology from an Access and Mobility Management Function (AMF) in the second core network.

20. The non-transitory computer-readable medium of claim 15, wherein
the first radio access technology is evolved universal terrestrial radio access (E-UTRA) technology,
the second radio access technology is new radio (NR) technology, and
the processing circuitry is included in an Access and Mobility Management Function (AMF) in the first core network, and
the obtaining the sidelink control information for the second radio access technology comprises receiving the sidelink control information for the second radio access technology from a mobility management entity (MME) in the second core network.

* * * * *